(12) United States Patent
Kokubo et al.

(10) Patent No.: US 12,573,210 B2
(45) Date of Patent: Mar. 10, 2026

(54) PARKING ASSISTANCE DEVICE

(71) Applicant: AISIN CORPORATION, Kariya (JP)

(72) Inventors: Yoshihito Kokubo, Kariya (JP);
Yoshihisa Suetsugu, Kariya (JP);
Shusaku Asada, Kariya (JP)

(73) Assignee: AISIN CORPORATION, Kariya (JP)

( * ) Notice: Subject to any disclaimer, the term of this
patent is extended or adjusted under 35
U.S.C. 154(b) by 256 days.

(21) Appl. No.: 18/271,952

(22) PCT Filed: Mar. 23, 2022

(86) PCT No.: PCT/JP2022/013721
§ 371 (c)(1),
(2) Date: Jul. 12, 2023

(87) PCT Pub. No.: WO2022/215534
PCT Pub. Date: Oct. 13, 2022

(65) Prior Publication Data
US 2024/0087335 A1 Mar. 14, 2024

(30) Foreign Application Priority Data

Apr. 5, 2021 (JP) ................................. 2021-063992

(51) Int. Cl.
*G06V 20/58* (2022.01)
*G06V 10/77* (2022.01)
(Continued)

(52) U.S. Cl.
CPC ........ *G06V 20/586* (2022.01); *G06V 10/7715*
(2022.01); *G06V 10/774* (2022.01); *G06V*
*10/955* (2022.01); *G08G 1/168* (2013.01)

(58) Field of Classification Search
CPC ............. G06V 20/586; G06V 10/7715; G06V
10/774; G06V 10/955; G08G 1/168;
B62D 15/028; B62D 15/0285
See application file for complete search history.

(56) References Cited

U.S. PATENT DOCUMENTS

2017/0177954 A1* 6/2017 Micks ................... G01S 13/931
2018/0068564 A1 3/2018 Tanigawa et al.
(Continued)

FOREIGN PATENT DOCUMENTS

CN 110706509 A 1/2020
JP 2005-175918 A 6/2005
(Continued)

OTHER PUBLICATIONS

Yoshihito Kokubo et al., "Parking Space Estimation using Light-
weight Model", IEICE Technical Report, Nov. 19, 2019, vol. 119,
No. 235, pp. 29-34 (6 Pages).
(Continued)

*Primary Examiner* — Jennifer Mehmood
*Assistant Examiner* — Vaisali Rao Koppolu
(74) *Attorney, Agent, or Firm* — Sughrue Mion, PLLC

(57) ABSTRACT

A parking assistance device performs a process for parking
a vehicle in a parking area based on a captured image
obtained by an imaging device mounted on the vehicle, and
includes a storage part that stores the captured image; a first
processing part that detects parking areas present in an
imaging area of the imaging device, based on a low-
resolution image obtained by reducing the resolution of the
captured image; a selecting part that selects a target parking
area from the detected parking areas when the parking areas
have been detected by the first processing part; an extracting
part that extracts an extraction image including the target
parking area from the captured image stored in the storage
part; and a second processing part that generates, based on
the extraction image, target information indicating a target
stop location used upon parking the vehicle in the target
parking area.

4 Claims, 6 Drawing Sheets

(51) Int. Cl.
    *G06V 10/774*       (2022.01)
    *G06V 10/94*        (2022.01)
    *G08G 1/16*         (2006.01)

(56)             References Cited

U.S. PATENT DOCUMENTS

| | | | | |
|---|---|---|---|---|
| 2019/0392229 | A1* | 12/2019 | Yamamoto | ........... G06V 20/586 |
| 2021/0042541 | A1* | 2/2021 | Kokubo | ................ G06F 18/214 |
| 2021/0146915 | A1* | 5/2021 | Niewiadomski | .......... G06T 7/13 |
| 2022/0161784 | A1* | 5/2022 | Lee | ........................... G06T 7/13 |
| 2024/0092344 | A1* | 3/2024 | Pang | ...................... G08G 1/145 |

FOREIGN PATENT DOCUMENTS

| | | | |
|---|---|---|---|
| JP | 2006-160194 | A | 6/2006 |
| JP | 2013-154730 | A | 8/2013 |
| JP | 2018-041176 | A | 3/2018 |
| JP | 2018-120386 | A | 8/2018 |
| JP | 2019-151181 | A | 9/2019 |
| JP | 2020-004368 | A | 1/2020 |

OTHER PUBLICATIONS

Mitsuru Hamada et al., "Development of Mobile Device-based Speech Enhancement System Using Lip-reading", The Japan Society of the Japan Society of Acoustics, vol. 3, No. 2020, Apr. 1, 2020, pp. 1169-1170 (2 pages).
Japanese Office Action dated Sep. 3, 2024 in Application No. 2023-512932.
International Search Report for PCT/JP2022/013721, dated Apr. 26, 2022.

\* cited by examiner

FIG. 6

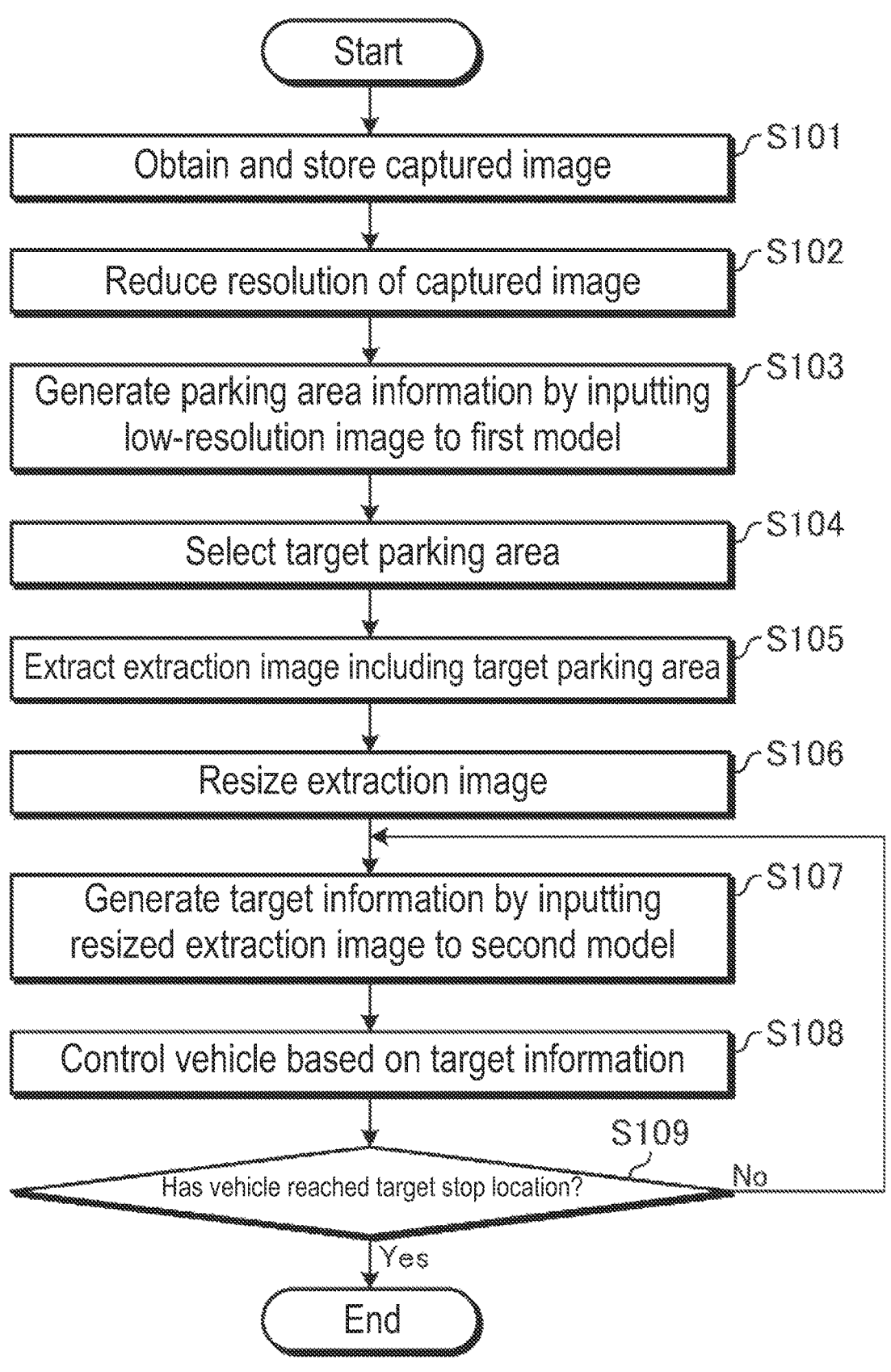

Start

Obtain and store captured image — S101

Reduce resolution of captured image — S102

Generate parking area information by inputting low-resolution image to first model — S103

Select target parking area — S104

Extract extraction image including target parking area — S105

Resize extraction image — S106

Generate target information by inputting resized extraction image to second model — S107

Control vehicle based on target information — S108

S109 — Has vehicle reached target stop location? — No

Yes

End

PARKING ASSISTANCE DEVICE

CROSS REFERENCE TO RELATED APPLICATIONS

This application is a National Stage of International Application No. PCT/JP2022/013721 filed Mar. 23, 2022, claiming priority based on Japanese Patent Application No. 2021-063992 filed Apr. 5, 2021, the entire contents of which are incorporated in their entirety.

TECHNICAL FIELD

The present disclosure relates to a parking assistance device.

BACKGROUND ART

A device that assists in parking a vehicle uses a technique for recognizing parking areas based on a result of analysis of a captured image obtained by an imaging device mounted on the vehicle.

CITATIONS LIST

Patent Literature

Patent Literature 1: JP 2018-041176 A

SUMMARY OF THE DISCLOSURE

Technical Problems

To improve the quality of parking assistance control, there is a need to improve the accuracy of recognition of parking areas. To improve the accuracy of recognition of parking areas, it is effective to use a high-resolution image as an analysis target, but the computational load increases as the resolution of an image increases, increasing the possibility of causing a reduction in processing speed, an increase in cost, etc.

Hence, one problem of the present disclosure is to provide a parking assistance device that can improve the accuracy of recognition of parking areas while suppressing an increase in computational load.

Solutions to Problems

One aspect of the present disclosure is a parking assistance device that performs a process for parking a vehicle in a parking area based on a captured image obtained by an imaging device mounted on the vehicle, and the parking assistance device includes: a storage part that stores the captured image; a first processing part that detects parking areas present in an imaging area of the imaging device, based on a low-resolution image obtained by reducing resolution of the captured image; a selecting part that selects a target parking area from the detected parking areas when the parking areas have been detected by the first processing part; an extracting part that extracts an extraction image including the target parking area from the captured image stored in the storage part; and a second processing part that generates, based on the extraction image, target information indicating a target stop location used upon parking the vehicle in the target parking area.

According to the above-described configuration, upon detecting (searching for) parking areas present around the vehicle, a low-resolution image is used, and upon generating target information indicating a target stop location used upon parking the vehicle in a target parking area selected from the detected parking areas, an extraction image extracted from a captured image is used. By this, while an increase in computational load is suppressed, the accuracy of recognition of parking areas is improved, enabling an improvement in the quality of parking assistance control.

In addition, the first processing part may detect one or more parking areas using a first trained model and based on a result of analysis of the low-resolution image, and the second processing part may detect the target parking area using a second trained model and based on a result of analysis of the extraction image, the second trained model being different from the first trained model.

Like the above-described configuration, by performing, using different trained models, a process for detecting one or more parking areas from a captured image and a process for detecting one target parking area from an extraction image, the overall process can be made efficient.

In addition, the second trained model may analyze a resized version of the extraction image, the extraction image being resized to a predetermined size.

By this, analysis can be performed on an extraction image of a fixed size regardless of the shape of a target parking area.

In addition, the parking assistance device may include: a first processor that generates an instruction signal for a traveling mechanism of the vehicle based on the target information; and a second processor that is connected to the first processor such that the first processor and the second processor can perform transmission and reception of information with each other, and that performs a process using the first trained model and a process using the second trained model.

Like the above-described configuration, by allowing different processors to perform a process of controlling a traveling mechanism and a process of recognizing parking areas using trained models, load concentration on a specific processor can be avoided.

BRIEF DESCRIPTION OF DRAWINGS

FIG. 6 is a flowchart showing an example of a process performed by the parking assistance device according to the embodiment.

DESCRIPTION OF EMBODIMENTS

An exemplified embodiment of the present disclosure is described below. Configurations of the embodiment shown below and the effects, results, and advantageous effects that are brought about by the configurations are examples. Aspects of the present disclosure can also be implemented by other configurations than the configurations disclosed in the following embodiment, and at least one of various advantageous effects and derivative advantageous effects based on a basic configuration can be obtained.

Figure 1:
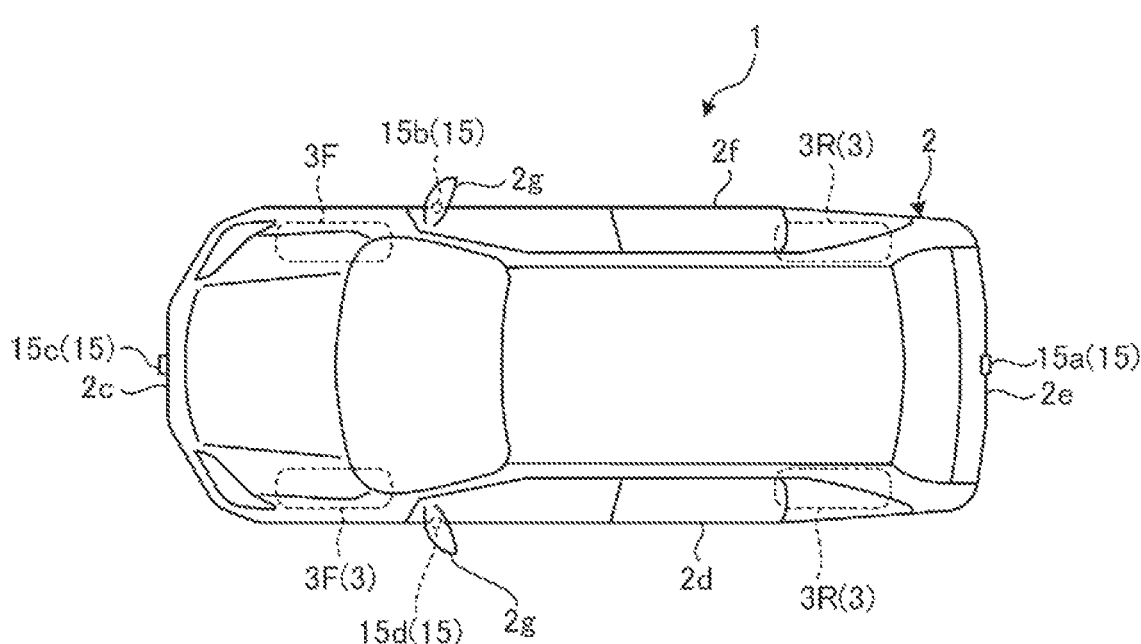
FIG. 1 is a diagram showing an example of a configuration of a vehicle according to an embodiment.

FIG. 1 is a diagram showing an example of a configuration of a vehicle 1 according to the embodiment. The vehicle 1 is controlled by a parking assistance device according to the present embodiment, and is a four-wheel automobile having a pair of left and right front wheels 3F and a pair of left and right rear wheels 3R.

The vehicle 1 has a plurality of (four in the present embodiment) imaging devices 15a to 15d. The imaging devices 15a to 15d each have an area around the vehicle 1 as their imaging areas. The imaging device 15a is provided at an end part 2e on a rear side of a vehicle body 2 (e.g., at the bottom of a rear trunk door) and captures an image of an area behind the vehicle 1. The imaging device 15b is provided on a door mirror 2g at an end part 2f on a right side of the vehicle body 2 and captures an image of an area on the right side of the vehicle 1. The imaging device 15c is provided at an end part 2c on a front side of the vehicle body 2 (e.g., on a front bumper) and captures an image of an area in front of the vehicle 1. The imaging device 15d is provided on a door mirror 2g at an end part 2d on a left side of the vehicle body 2 and captures an image of an area on the left side of the vehicle 1. The imaging devices 15a to 15d each obtain a captured image (image data) corresponding to their imaging areas. When the imaging devices 15a to 15d do no need to be distinguished from each other, the imaging devices 15a to 15d may be collectively referred to as imaging devices 15.

Figure 2:
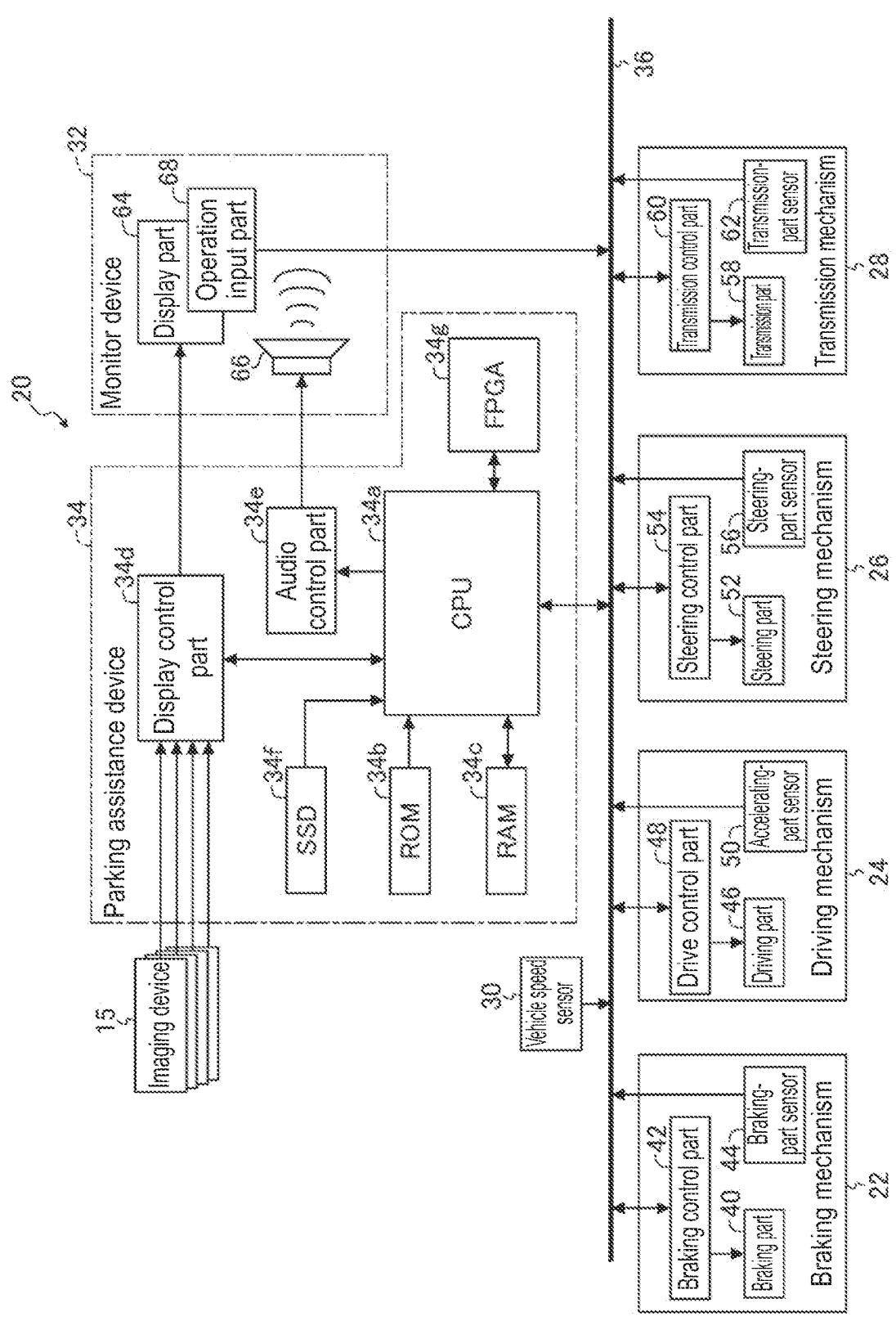
FIG. 2 is a block diagram showing a configuration of a vehicle control system according to the embodiment.

FIG. 2 is a block diagram showing a configuration of a vehicle control system 20 according to the embodiment. The vehicle control system 20 according to the present embodiment includes the imaging devices 15, a braking mechanism 22, a driving mechanism 24, a steering mechanism 26, a transmission mechanism 28, a vehicle speed sensor 30, a monitor device 32, a parking assistance device 34, and an intra-vehicle network 36.

The braking mechanism 22 is a mechanism for decelerating the vehicle 1. The braking mechanism 22 includes a braking part 40, a braking control part 42, and a braking-part sensor 44. The braking part 40 includes, for example, brake pads, brake discs, and a brake pedal. The braking control part 42 is, for example, an electronic device including a central processing unit (CPU), etc. The braking control part 42 controls the braking part 40 based on an instruction signal from the parking assistance device 34 to control deceleration of the vehicle 1. The braking-part sensor 44 is, for example, a sensor that detects the position of the brake pedal, and outputs a result of the detection to the intra-vehicle network 36.

The driving mechanism 24 is a mechanism for driving (accelerating) the vehicle 1. The driving mechanism 24 includes a driving part 46, a drive control part 48, and a driving-part sensor 50. The driving part 46 includes, for example, an internal combustion engine, an electric motor, and an accelerator pedal. The drive control part 48 is, for example, an electronic device including a CPU, etc. The drive control part 48 controls the driving part 46 based on an instruction signal from the parking assistance device 34 to control the speed or acceleration of the vehicle 1. The driving-part sensor 50 is, for example, a sensor that detects the position of the accelerator pedal, and outputs a result of the detection to the intra-vehicle network 36.

The steering mechanism 26 is a mechanism for changing a traveling direction of the vehicle 1. The steering mechanism 26 includes a steering part 52, a steering control part 54, and a steering-part sensor 56. The steering part 52 includes, for example, a steering wheel. The steering control part 54 is, for example, an electronic device including a CPU, etc. The steering control part 54 controls the steering part 52 based on an instruction signal from the parking assistance device 34 to control the traveling direction of the vehicle 1. The steering-part sensor 56 is, for example, a sensor that detects the turning angle (steering angle) of the steering wheel, and outputs a result of the detection to the intra-vehicle network 36.

The transmission mechanism 28 is a mechanism for changing the transmission gear ratio of the vehicle 1. The transmission mechanism 28 includes a transmission part 58, a transmission control part 60, and a transmission-part sensor 62. The transmission part 58 includes, for example, an automatic transmission, a continuously variable transmission, a manual transmission, and a gearshift. The transmission control part 60 is, for example, an electronic device including a CPU, etc. The transmission control part 60 controls the transmission part 58 based on an instruction signal from the parking assistance device 34 to control the transmission gear ratio of the vehicle 1. The transmission-part sensor 62 is, for example, a sensor that detects the position of the gearshift, and outputs a result of the detection to the intra-vehicle network 36.

The vehicle speed sensor 30 is, for example, a sensor that detects the amount of rotation of wheels 3 of the vehicle 1 or the number of rotations per unit time made by the wheels 3. The vehicle speed sensor 30 outputs a result of the detection to the intra-vehicle network 36.

The monitor device 32 is a user interface provided in a dashboard, etc., in the interior of the vehicle 1. The monitor device 32 includes a display part 64, an audio output part 66, and an operation input part 68.

The display part 64 displays an image based on image data transmitted from the parking assistance device 34. The display part 64 is, for example, a display device such as a liquid crystal display or an organic EL display. The display part 64 displays an image that allows a user to perform, for example, an operation for switching between autonomous driving and manual driving or for selecting a target parking area.

The audio output part 66 outputs audio based on audio data transmitted from the parking assistance device 34. The audio output part 66 is, for example, a speaker.

The operation input part 68 accepts passenger's input. The operation input part 68 is, for example, a touch panel. The operation input part 68 is provided on a display screen of the display part 64. The operation input part 68 is configured to allow an image displayed on the display part 64 to pass therethrough. By this, the operation input part 68 allows a passenger to visually recognize an image displayed on the display screen of the display part 64. The operation input part 68 accepts an instruction inputted by the passenger touching a location corresponding to an image displayed on the display screen of the display part 64, and transmits the instruction to the parking assistance device 34. Note that the operation input part 68 is not limited to a touch panel and may be a hard switch of a push-button type, etc.

The parking assistance device 34 is an electronic control unit that performs various types of processes for assisting in traveling upon parking the vehicle 1 in a parking area. The parking assistance device 34 according to the present embodiment includes a CPU 34a (first processor), a read only memory (ROM) 34b, a random access memory (RAM) 34c, a display control part 34d, an audio control part 34e, a solid state drive (SSD) 34*f*, and a field programmable gate array (FPGA) 34*g* (second processor). The CPU 34*a*, the ROM 34*b*, and the RAM 34*c* may be integrated in the same package.

The CPU 34*a* reads a program stored in a non-volatile storage device such as the ROM 34*b*, and performs various types of computation processes and control processes in accordance with the program. Upon providing parking assistance by autonomous driving (including semi-autonomous driving) of the vehicle 1, the CPU 34*a* according to the present embodiment generates an instruction signal for controlling a traveling mechanism (at least one of the braking mechanism 22, the driving mechanism 24, the steering mechanism 26, and the transmission mechanism 28) of the vehicle.

The ROM 34*b* stores a program, parameters required to execute the program, etc. The RAM 34*c* temporarily stores various types of data used in computations performed by the CPU 34*a*.

The display control part 34*d* is an integrated circuit that mainly performs a process on image data obtained by the imaging devices 15 among computation processes performed by the parking assistance device 34. The display control part 34*d* performs, for example, data conversion of an image for display to be displayed on the display part 64 and data conversion upon outputting image data from the imaging devices 15 to the CPU 34*a*. The audio control part 34*e* is an integrated circuit that mainly performs a process on audio to be outputted by the audio output part 66 among computation processes performed by the parking assistance device 34. The SSD 34*f* is a non-volatile, rewritable storage device, and maintains data even when the power to the parking assistance device 34 is turned off. The SSD 34*f* at least temporarily stores image data (captured images) obtained by the imaging devices 15.

The FPGA 34*g* mainly performs an analysis process for recognizing parking areas, based on a captured image obtained by an imaging device 15 among computation processes performed by the parking assistance device 34. The FPGA 34*g* according to the present embodiment is hardware that analyzes a captured image using trained models created by predetermined machine learning (deep learning).

The intra-vehicle network 36 includes, for example, a controller area network (CAN) and a local interconnect network (LIN). The intra-vehicle network 36 connects the braking mechanism 22, the driving mechanism 24, the steering mechanism 26, the transmission mechanism 28, the vehicle speed sensor 30, the operation input part 68 of the monitor device 32, the parking assistance device 34, etc., to each other such that they can mutually perform transmission and reception of information.

Note that a hardware configuration shown in FIG. 2 is an example and the configuration of the parking assistance device 34 is not limited to the one described above.

Figure 3:
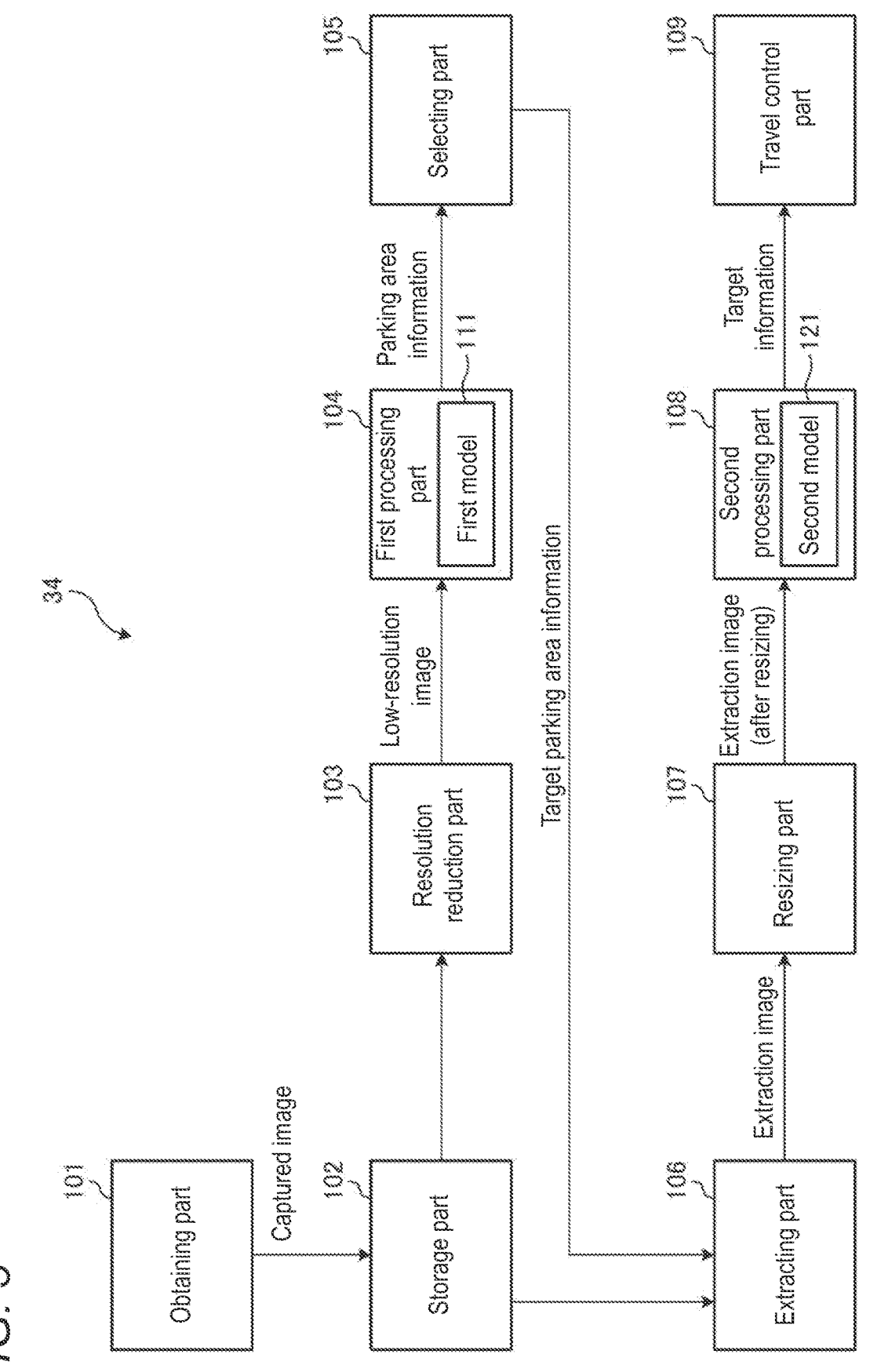
FIG. 3 is a block diagram showing an example of a functional configuration of a parking assistance device according to the embodiment.

FIG. 3 is a block diagram showing an example of a functional configuration of the parking assistance device 34 according to the embodiment. The parking assistance device 34 according to the present embodiment includes an obtaining part 101, a storage part 102, a resolution reduction part 103, a first processing part 104, a selecting part 105, an extracting part 106, a resizing part 107, a second processing part 108, and a travel control part 109. These functional components are implemented by cooperation of hardware such as that described above and software such as a program.

The obtaining part 101 obtains a captured image obtained by capturing an image of an area around the vehicle 1.

The storage part 102 stores the captured image obtained by the obtaining part 101.

The resolution reduction part 103 generates a low-resolution image obtained by reducing the resolution of the captured image stored in the storage part 102 (obtained by the obtaining part 101).

The first processing part 104 detects parking areas present in an imaging area of an imaging device 15 based on the low-resolution image generated by the resolution reduction part 103, and generates parking area information about the parking areas. The parking areas are areas in which the vehicle 1 can be parked and are, for example, areas marked off by parking lines in a parking lot. The parking area information includes information that allows estimation of the location, area, shape, etc., of each parking area and includes, for example, information indicating the locations of points of intersection of parking lines, directions in which the parking lines extend, etc. The first processing part 104 according to the present embodiment analyzes the low-resolution image using a first model 111 which is a trained model, and detects (searches for) parking areas based on a result of the analysis.

When parking areas have been detected by the first processing part 104, the selecting part 105 selects one target parking area from the parking areas. The target parking area is a parking area in which the vehicle 1 is finally parked, and may be automatically selected by the parking assistance device 34 based on a predetermined condition or may be manually selected by a user. The selecting part 105 generates target parking area information about the selected target parking area. The target parking area information includes, for example, information indicating the location, area, shape, etc., of the target parking area.

Based on the target parking area information generated by the selecting part 105, the extracting part 106 extracts an extraction image including the target parking area from the captured image stored in the storage part 102. For example, the extraction image is extracted by cutting an image of a partial area including the target parking area from the captured image.

The resizing part 107 changes (resizes) the size of the extraction image extracted by the extracting part 106 to a predetermined size.

The second processing part 108 generates target information indicating a target stop location used upon parking the vehicle 1 in the target parking area, based on the extraction image having been resized by the resizing part 107. The target information includes, for example, information that allows estimation of a positional relationship between the vehicle 1 and the target stop location and includes, for example, information indicating the locations of points of intersection of parking lines of the target parking area, directions in which the parking lines extend, etc.

The second processing part 108 according to the present embodiment has a second model 121. The second model 121 is a trained model different from the first model 111. The second processing part 108 according to the present embodiment analyzes the extraction image (resized extraction image) using the second model 121, detects (captures) a target stop location in the target parking area based on a result of the analysis, and generates target information. In addition, the second model 121 may analyze the extraction image further using auxiliary information indicating the location of the target parking area which is included in the parking area information generated by the first processing part 104 (first model 111).

Based on the target information generated by the second processing part 108, the travel control part 109 generates a control signal for controlling a traveling mechanism (at least one of the braking mechanism 22, the driving mechanism 24, the steering mechanism 26, and the transmission mechanism 28) of the vehicle 1.

According to the above-described configuration, upon detecting (searching for) parking areas present around the vehicle, a low-resolution image is used, and upon generating target information indicating a target stop location used upon parking the vehicle 1 in a target parking area selected from the detected parking areas, an extraction image extracted from a captured image is used. By this, while an increase in computational load is suppressed, the accuracy of recognition of parking areas is improved, enabling an improvement in the quality of parking assistance control.

Figure 4:
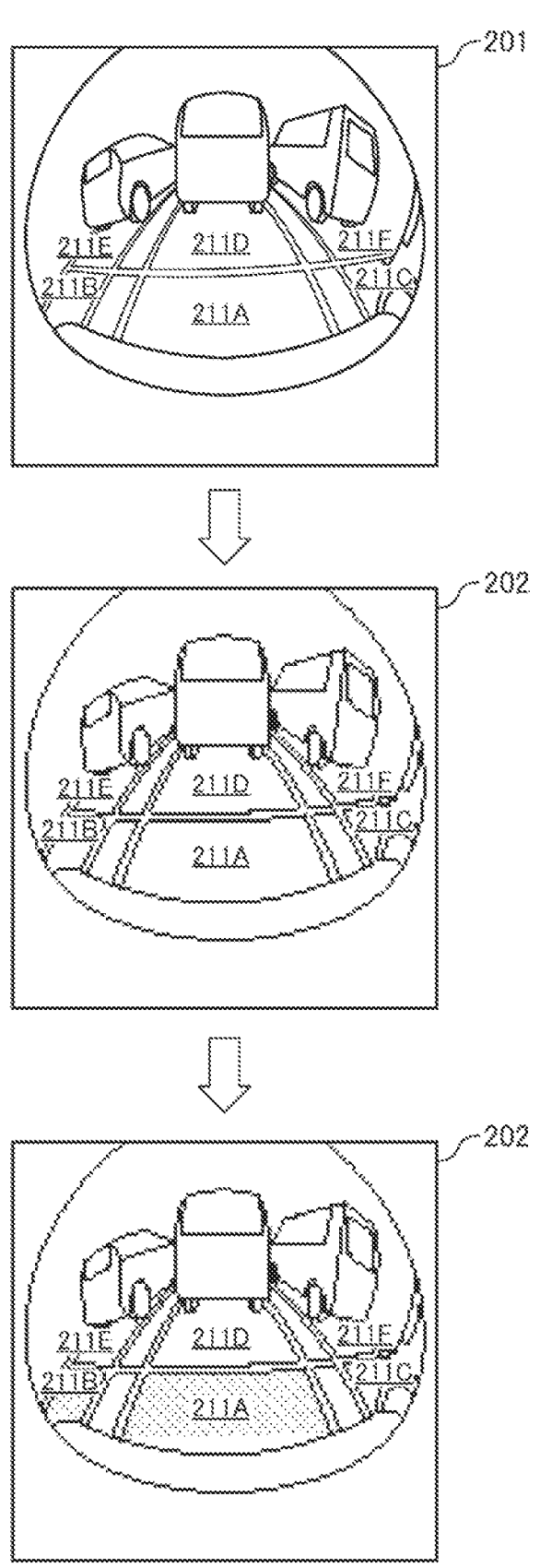
FIG. 4 is a diagram showing examples of a captured image and a low-resolution image according to the embodiment.

FIG. 4 is a diagram showing examples of a captured image 201 and a low-resolution image 202 according to the embodiment. The captured image 201 exemplified here is an image captured by the imaging device 15a provided at the end part 2e on the rear side of the vehicle 1. The captured image 201 can be, for example, an image whose number of pixels is about 1280*800. The captured image 201 includes six parking areas 211A to 211F. Of the six parking areas 211A to 211F, two parking areas 211A and 211B are vacant and four parking areas 211C to 211F have other vehicles parked therein. The parking areas 211A to 211F may be hereinafter collectively referred to as parking areas 211.

In the middle of FIG. 4 there is exemplified a low-resolution image 202 obtained by reducing the resolution of the captured image 201. The low-resolution image 202 is obtained by converting the entire captured image 201 into an image having resolution with a smaller number of pixels than that of the captured image 201. The first processing part 104 detects candidates for parking areas in which the vehicle 1 can be parked, based on a result of analysis obtained by inputting such a low-resolution image 202 to the first model 111. Here, as shown at the bottom of FIG. 4, the two vacant parking areas 211A and 211B are detected as candidates, and parking area information about the parking areas 211A and 211B is generated.

Figure 5:
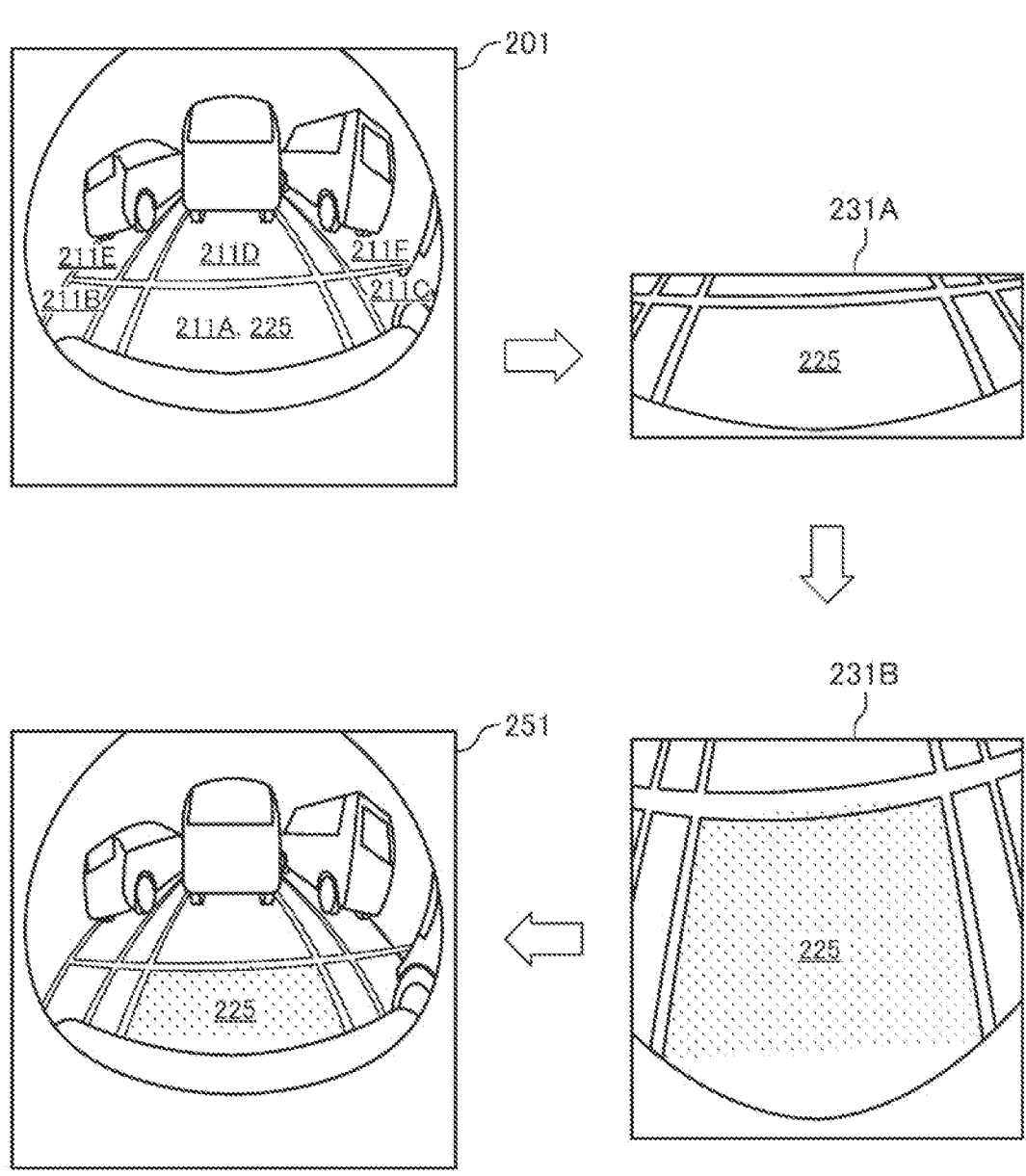
FIG. 5 is a diagram showing examples of extraction images and an analysis result image according to the embodiment.

FIG. 5 is a diagram showing examples of extraction images 231A and 231B and an analysis result image 251 according to the embodiment. Here, a case is exemplified in which of the parking areas 211A and 211B detected as described above, the parking area 211A closest to the vehicle 1 is selected as a target parking area 225. In this case, the extraction image 231A including the target parking area 225 (in the upper right of FIG. 5) is extracted from a captured image 201 stored in the storage part 102 (in the upper left of FIG. 5). Upon the extraction, the extraction image 231A is extracted so as to include the entire target parking area 225 and so as not to include the entire other parking areas (the parking areas 211B to 211F adjacent to the target parking area 225). The extraction image 231A is resized to the extraction image 231B of a predetermined size (in the lower right of FIG. 5). By inputting the resized extraction image 231B to the second model 121, detection of a target stop location for the target parking area 225 is performed.

Note that although, in this example, the extraction image 231A before resizing is rectangular and the extraction image 231B after resizing is square, the form of resizing is not limited thereto. The shape of the extraction image 231A before resizing varies depending on the shape, etc., of the target parking area 225. By performing resizing as described above, analysis by the second model 122 can be performed using the extraction image 231B of a fixed size regardless of the shape of the target parking area 225.

In the lower left of FIG. 5 there is exemplified the analysis result image 251 in which a result of analysis performed on the extraction image 231B is reflected in the captured image 201. The analysis result image 251 includes information indicating the location, area, shape, etc., of the target parking area 225, and based on such an analysis result image 251, target information for determining a target stop location of the vehicle 1, etc., can be generated.

FIG. 6 is a flowchart showing an example of a process performed by the parking assistance device 34 according to the embodiment. When the obtaining part 101 obtains a captured image 201, the captured image 201 is stored in the storage part 102 (S101). The resolution reduction part 103 reduces the resolution of the captured image 201 obtained by the obtaining part 101 (stored in the storage part 102), thereby generating a low-resolution image 202 (S102).

The first processing part 104 inputs the low-resolution image 202 to the first model 111, thereby generating parking area information about parking areas 211 present in an imaging area (an area around the vehicle 1) (S103). When the parking areas 211 have been detected by the first processing part 104, the selecting part 105 selects, based on the parking area information, a target parking area 225 that matches a predetermined condition from the one or more parking areas 211 (S104). The extracting part 106 extracts an extraction image 231A including the target parking area 225 from the captured image 201 stored in the storage part 102 (S105). The resizing part 107 resizes the extraction image 231A to an extraction image 231B of a predetermined size (S106). The second processing part 108 inputs the resized extraction image 231B to the second model 121, thereby generating target information indicating a target stop location for the target parking area 225 (S107). The travel control part 109 controls travel of the vehicle 1 based on the target information (S108), and if the vehicle 1 has reached the target stop location (S109: Yes), then the present routine ends. If the vehicle 1 has not reached the target stop location (S109: No), then an extraction image 231A including the target parking area 225 is extracted and resized again, using a detected target location, a vehicle's moving distance, etc., obtained at the last point in time, and step S107 (regeneration of target information) is performed.

A program that causes the parking assistance device 34 to perform various types of processes such as those described above may be stored as a file in an installable format or an executable format in a computer-readable storage medium such as a CD-ROM, a CD-R, a memory card, a digital versatile disk (DVD), or a flexible disk (FD), and provided as a computer program product. In addition, the program may be stored on a computer connected to a network such as the Internet, and provided by downloading the program via the network. In addition, the program may be provided or distributed via a network such as the Internet.

According to the above-described embodiment, upon detecting (searching for) one or more parking areas 211 present around the vehicle 1, a low-resolution image 202 is used, and upon detecting (capturing) a target parking area 225 selected from the one or more parking areas 211, high-resolution extraction images 231A and 231B are used. By this, while an increase in computational load is suppressed, the accuracy of recognition of parking areas is improved, enabling an improvement in the quality of parking assistance control.

Although the embodiment of the present disclosure has been described above, the above-described embodiment is presented as an example and is not intended to limit the scope of the claimed invention. The new embodiment can be implemented in various other modes, and various omissions, substitutions, or changes can be made without departing from the spirit of the disclosure. The embodiment and variants thereof are included in the scope and spirit of the disclosure and included in the various inventive aspects described in the claims and in the range of equivalency thereof.

REFERENCE SIGNS LIST

1: Vehicle, 2: Vehicle body, 3: Wheel, 15, 15a to 15d: Imaging device, 20: Vehicle control system, 22: Braking mechanism, 24: Driving mechanism, 26: Steering mechanism, 28: Transmission mechanism, 30: Vehicle speed sensor, 32: Monitor device, 34: Parking assistance device, 34a: CPU (First processor), 34g: FPGA (Second processor), 36: Intra-vehicle network, 101: Obtaining part, 102: Storage part, 103: Resolution reduction part, 104: First processing part, 105: Selecting part, 106: Extracting part, 107: Resizing part, 108: Second processing part, 109: Travel control part, 111: First model (First trained model), 121: Second model (Second trained model), 201: Captured image, 202: Low-resolution image, 211A to 211F: Parking area, 225: Target parking area, 231A, 231B: Extraction image, and 251: Analysis result image

The invention claimed is:

1. A parking assistance device that performs a process for parking a vehicle in a parking area based on a captured image obtained by an imaging device mounted on the vehicle, the parking assistance device comprising:

a storage part that stores the captured image;

a first processing part that detects parking areas present in an imaging area of the imaging device, based on a low-resolution image obtained by reducing resolution of the captured image;

a selecting part that selects a target parking area from the detected parking areas when the parking areas have been detected by the first processing part;

an extracting part that extracts an extraction image including the target parking area from the captured image stored in the storage part; and a second processing part that generates, based on the extraction image, target information indicating a target stop location used upon parking the vehicle in the target parking area, wherein the extraction image has a higher resolution than the low-resolution image.

2. The parking assistance device according to claim 1, wherein the first processing part detects the parking areas using a first trained model and based on a result of analysis of the low-resolution image, and the second processing part detects the target parking area using a second trained model and based on a result of analysis of the extraction image, the second trained model being different from the first trained model.

3. The parking assistance device according to claim 2, wherein the second trained model analyzes a resized version of the extraction image, the extraction image being resized to a predetermined size.

4. The parking assistance device according to claim 2, comprising:

a first processor that generates an instruction signal for a traveling mechanism of the vehicle based on the target information; and a second processor that is connected to the first processor such that the first processor and the second processor can perform transmission and reception of information with each other, and that performs a process using the first trained model and a process using the second trained model.

* * * * *